US010310737B1

(12) United States Patent
Sankara Subramanian et al.

(10) Patent No.: US 10,310,737 B1
(45) Date of Patent: *Jun. 4, 2019

(54) SIZE-TARGETED DATABASE I/O COMPRESSION

(71) Applicant: Amazon Technologies, Inc., Seattle, WA (US)

(72) Inventors: Subramanian Sankara Subramanian, Mercer Island, WA (US); Stefano Stefani, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 5 days.

This patent is subject to a terminal disclaimer.

(21) Appl. No.: 15/404,809

(22) Filed: Jan. 12, 2017

Related U.S. Application Data

(63) Continuation of application No. 13/872,996, filed on Apr. 29, 2013, now Pat. No. 9,575,982.

(51) Int. Cl.
*G06F 16/00* (2019.01)
*G06F 3/06* (2006.01)
*G06F 16/31* (2019.01)
*G06F 16/174* (2019.01)
*G06F 16/22* (2019.01)

(52) U.S. Cl.
CPC ............ *G06F 3/0608* (2013.01); *G06F 3/065* (2013.01); *G06F 3/068* (2013.01); *G06F 3/0619* (2013.01); *G06F 16/1744* (2019.01); *G06F 16/328* (2019.01); *G06F 16/2291* (2019.01)

(58) Field of Classification Search
CPC ............ G06F 17/30153; G06F 3/0608; G06F 2212/401; G06F 17/30501; G06F 2212/1044; G06F 2212/7204; G06F 16/17–16/1744
USPC .................................. 707/693; 711/147–173
See application file for complete search history.

(56) References Cited

U.S. PATENT DOCUMENTS

| | | | |
|---|---|---|---|
| 8,484,405 B2 | 7/2013 | Mashtizadeh et al. | |
| 8,626,987 B2 | 1/2014 | Jung et al. | |
| 8,799,614 B2 * | 8/2014 | Mansson | G06F 12/023 |
| | | | 707/693 |
| 8,832,045 B2 | 9/2014 | Dodd et al. | |
| 8,898,118 B2 | 11/2014 | Sainath | |
| 10,175,914 B2 * | 1/2019 | Ross | G06F 3/067 |

(Continued)

*Primary Examiner* — Michelle N Owyang
(74) *Attorney, Agent, or Firm* — Davis Wright Tremaine LLP

(57) ABSTRACT

Solid-state storage devices may be employed to store data maintained by a database management system, but may have characteristics that reduce the efficiency of interactions between the database management system and the device. A storage subsystem may receive information indicative of internal boundaries within database data. A segment of the database data may be selected for compression, wherein the size of the segment is based at least on one or more the internal boundaries, the memory page size of the solid-state drive, and a predicted rate of compression. The compressed segment may be stored if it has a size less than the memory page size of the device. If it does not, compression may be retried with a smaller segment of data or a portion of the data may be stored in uncompressed form. Additional segments of the data may be stored on the solid-state drive in a similar manner.

20 Claims, 12 Drawing Sheets

(56) References Cited

U.S. PATENT DOCUMENTS

| | | |
|---|---|---|
| 10,176,188 B2 * | 1/2019 | Srinivasan .............. G06F 16/36 |
| 2003/0061457 A1 | 3/2003 | Geiger |
| 2009/0112949 A1 | 4/2009 | Ergan et al. |
| 2010/0161567 A1 | 6/2010 | Makela |
| 2012/0317333 A1 | 12/2012 | Yamamoto et al. |
| 2013/0198435 A1 | 8/2013 | Sandadi et al. |
| 2014/0189281 A1 | 7/2014 | Sokol, Jr. |
| 2014/0244603 A1 | 8/2014 | Arges et al. |

* cited by examiner

SIZE-TARGETED DATABASE I/O COMPRESSION

CROSS REFERENCE TO RELATED APPLICATIONS

This application is a continuation of U.S. patent application Ser. No. 13/872,996 filed on Apr. 29, 2013, the entire contents of which are incorporated herein by reference.

BACKGROUND

A database management system ("DBMS") may be coupled to a variety of storage device types. Although a DBMS may present a logical view of data, the DBMS also uses an underlying physical storage medium to store large amounts of data. Traditional magnetic disk-based storage devices have been commonly used with DBMSs as the physical storage medium. Increasingly, solid-state storage devices, also known as solid-state drives are being used as the physical storage medium. Solid state storage devices offer improved performance and reliability primarily because they eliminate the spinning disks and moving read-write heads of traditional storage devices.

On the other hand, solid-state storage devices have characteristics that may reduce performance when used in conjunction with database management systems. Solid-state storage devices may, for example, comprise a memory organization that is divided into memory pages of relatively small size compared to the logical storage sizes that may be employed by DBMSs. In addition, solid-state storage drives may have different write characteristics than magnetic disks drives. For example, some types of solid-state drives may not allow data to be written directly to memory. Instead, these types of solid-state drives may require data to be written in blocks, and may require that a block first be erased and then rewritten.

BRIEF DESCRIPTION OF DRAWINGS

The drawings provided herein are designed to illustrate example embodiments and are not intended to limit the scope of the disclosure.

DETAILED DESCRIPTION

Figure 1:
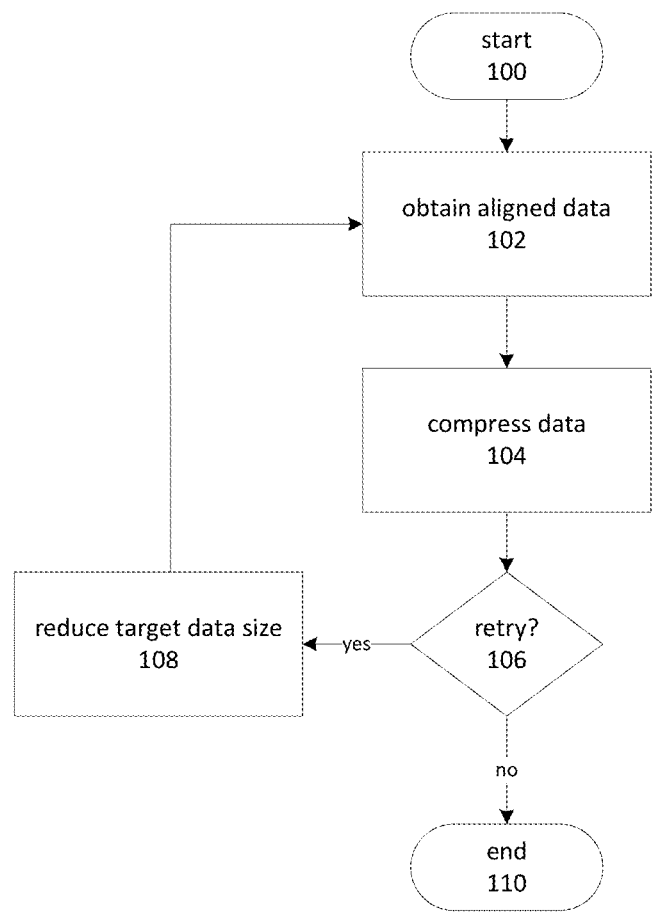
FIG. 1 is a flowchart depicting an overview of an embodiment for improving interaction between a database management system and a solid-state drive.

Solid state drives are a category of storage devices that employ integrated circuits as memory in which data may be stored. Solid-state drives may be constructed using Negated And ("NAND") flash memory, Negated Or ("NOR") flash memory, dynamic random access memory ("DRAM") and so forth. Non-volatile memory types may be utilized because they retain information even when not supplied with power. Solid-state drives may also be constructed with various combinations of memory types, including both volatile and non-volatile memory.

Solid-state drives may also have a controller, which performs various functions for the solid-state drive including acting as a bridge between the solid-state drive's memory banks and a host computer to which the solid-state drive is coupled. Controllers may also perform functions including error collection, caching, wear leveling, bad-block mapping, encryption and so on. Additional solid-state drive components may include caches, buffers, batteries and one or more interface components. Supported interfaces may include serial AT attachment ("SATA"), integrated drive electronics ("IDE"), peripheral component interconnect ("PCI") Express, fibre channel, small computer system interface ("SCSI") and so forth.

Solid-state drives may provide substantially improved reliability and performance characteristics when compared to traditional magnetic or optical disk drives, which are dependent on spinning disks and movable read/write heads. For example, Solid-state drives may have improved random access and read latency characteristics when compared to conventional drives. Solid-state drives may also have improved symmetry between read and write times, and unlike conventional drives are not affected by the on-disk location of data to be read or written. In addition, because Solid-state drives have no moving parts, they are less susceptible to mechanical malfunctions.

Solid-state drives may also have various characteristics or limitations. One of these involves performance degradation over time. The individual cells of NAND memory may experience a slight decrease in read-write performance each time the memory is erased. Unlike conventional magnetic disk storage, NAND-based memory cells may not be directly overwritten. Instead, a write operation may involve erasing the contents of the cell and then writing the new data. Each cycle may degrade the cell's performance and the cell may eventually become unusable. A solid-state drive may utilize a technique sometimes described as wear leveling to help minimize erase-write cycles performed, thus prolonging the life of the solid-state drive.

Data in a solid-state drive may be read or written in units of memory called pages, which may for example be 4 kilobytes in length. However, erasing cells may require larger block sizes, such as a 256 kilobyte group of 64 pages. The controller may employ garbage collection techniques to utilize previously erased pages and minimize the number of erase-write cycles performed. As used herein, the terms memory page and drive memory page refer to pages of memory in a solid-state drive.

Related to erase-write cycle performance degradation is a concept sometimes described as write amplification. This concept involves a phenomenon in which the actual amount of data written to storage device is more than the logical amount of data. For example, a binary data structure 2 kilobytes in length may be written as a 4 kilobyte block to an solid-state drive with a 4 kilobyte memory page size. This may be undesirable in light of the performance degradation associated with erase-write cycles. Furthermore, higher degrees of write amplification may be associated with wasted space, increased bandwidth utilization and other factors that may decrease system performance.

As suggested by the aforementioned characteristics, aspects of the present disclosure describe techniques for improving the read and write interaction between databases and solid-state drives. FIG. 1 depicts an illustrative embodiment for performing database writes. Although depicted as a sequence of operations starting with operation 100 and ending with 110, those of ordinary skill in the art will appreciate that the operations depicted in FIG. 1 are intended to be illustrative of general concepts. Some or all of the depicted elements may be altered, omitted, reordered or performed in parallel.

Operation 102 depicts obtaining data aligned with structural boundaries contained within the data. For example, databases may store data as a series of rows or items. It may be disadvantageous to allow a given row to be split between solid-state drive memory pages. Accordingly, operation 102 may access a subset of a set of data to be stored, where the subset does not include any partial rows. Operation 102 may also involve determining a size for the subset of data. This may be based on an amount of data that could be compressed to fit within a single drive memory page. Determining the amount of data may involve estimating one or more compression algorithm's effectiveness and using the value to forecast how much data could be compressed to fit on a drive memory page.

Operation 104 depicts compressing the data. After the compression, operation 106 may determine if a retry is in order. This may be the case when the compression algorithm failed to shrink the data to fit the required drive memory page size. Retries may also be allowed or denied based on other various factors, such as a maximum number of attempts or on the amount of time that has elapsed performing previous compression attempts.

If a retry is in order, operation 108 may be performed to reduce the target size of the data and to then retry the compression. The new, smaller subset of data obtained at operation 102 must also be aligned. Once the data has been compressed to fit onto a drive memory page, it can be written to the drive memory page. If the data cannot be compressed to fit, a sufficient quantity of data can be extracted and stored in the drive memory page without compression.

Figure 2:
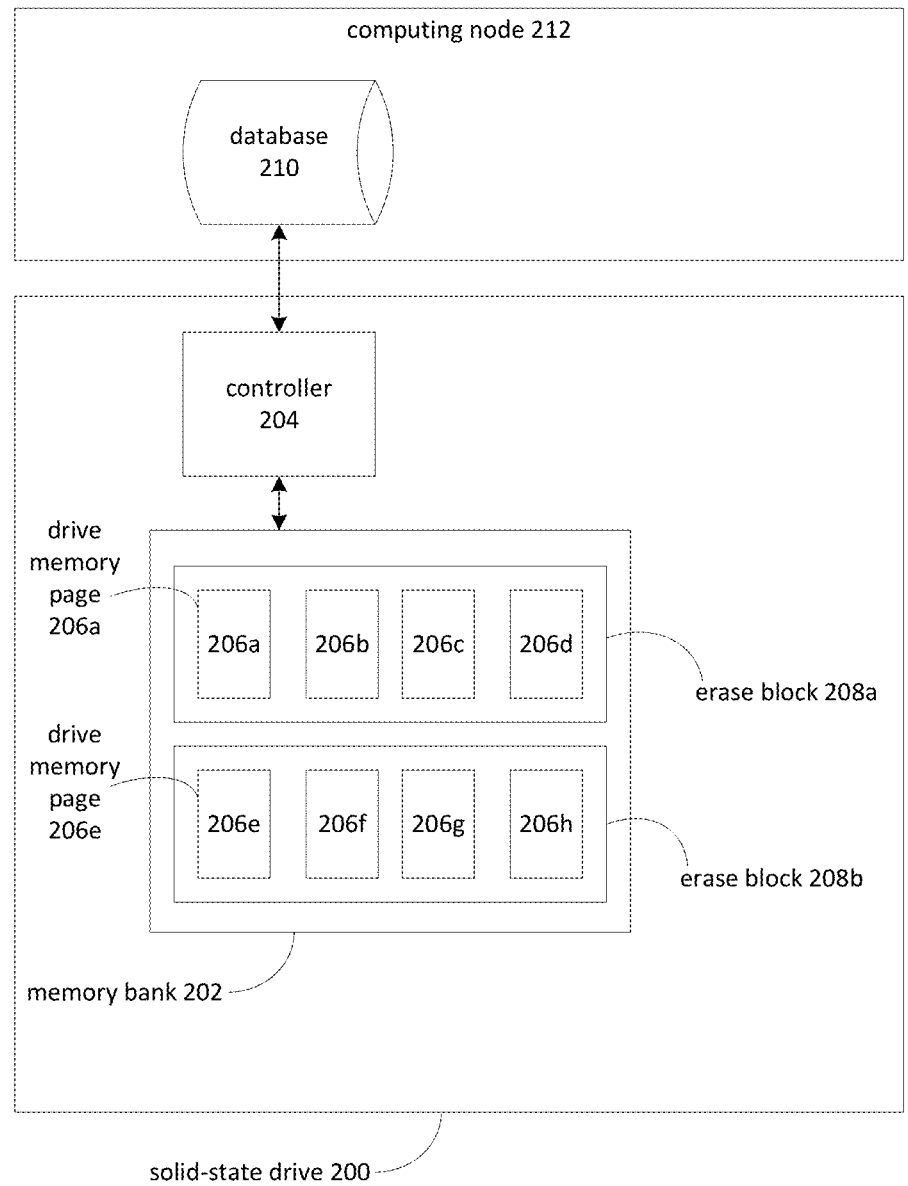
FIG. 2 is a block diagram depicting a system involving interaction between a database management system and a solid-state drive.

FIG. 2 describes interaction between a database and solid-state drive in greater detail. Database 210, operating on computing node 212, writes data to solid state drive 200.

Controller 204 coordinates the process of erasing and writing to drive memory pages in solid-state drive memory bank 202. Drive memory pages 206a to 206d may be grouped in erase block 208a, and drive memory pages 206e to 206h may be grouped into erase block 208b. In some embodiments, all of the data in an erase block is erased and rewritten prior to writing data to any of the drive memory pages contained within the erase block. For example, to write data to drive memory page 206b, drive memory pages 206a-206d may all be erased and rewritten.

The various advantages of solid-state drives compared to traditional magnetic storage drives may make them suitable for use with database management systems, which tend to rely on storage device efficiency to achieve good performance. Accordingly, databases that use solid-state drives may also see improved performance characteristics. The performance may be further enhanced by adapting the database management system's read and write behavior for use with solid-state drives. Non-limiting examples of database management systems include relational and non-relational databases, key-value databases, large-object databases, Extensible Markup Language ("XML") databases, spatial databases and so forth. These and other types of databases may benefit from improved interaction with solid-state drives.

Database management systems may organize data using conceptual approaches that are both numerous and varied. One approach, which may be seen in relational database management systems, organizes data according to rows and columns. Another approach, which may be used in key-value databases or No Structured Query Language ("NoSQL") databases, may organize data using key-value stores, tuple stores, associative arrays and so forth. For conciseness, the present disclosure uses the term table to encompass any of these organizational structures. Those of ordinary skill in the art will appreciate that the techniques disclosed herein may be readily adapted for use with many alternative conceptual approaches to organizing data.

In order to store and retrieve data, database management systems may map from the table's conceptual approach to organizing data to a physical arrangement on a storage device such as a hard-disk drive or solid-state drive. The data in a table may be stored on disk as a collection of one or more files. Multiple files may be used for a variety of reasons, including manageability for large table sizes. Multiple small files may be more easily copied than a single large file, for example.

The data stored in the files may be arranged in various ways. One arrangement involves storing data row-by-row, so that each file represents a subset of the rows that make up the entire table. A similar arrangement may be employed for key-value databases, in which each file contains a subset of all items associated with a particular table or item store. Another possible arrangement involves arranging data according to columns, in which each file contains data pertaining to a single column of data, rather than several columns as might be seen in row-oriented storage.

Figure 3:
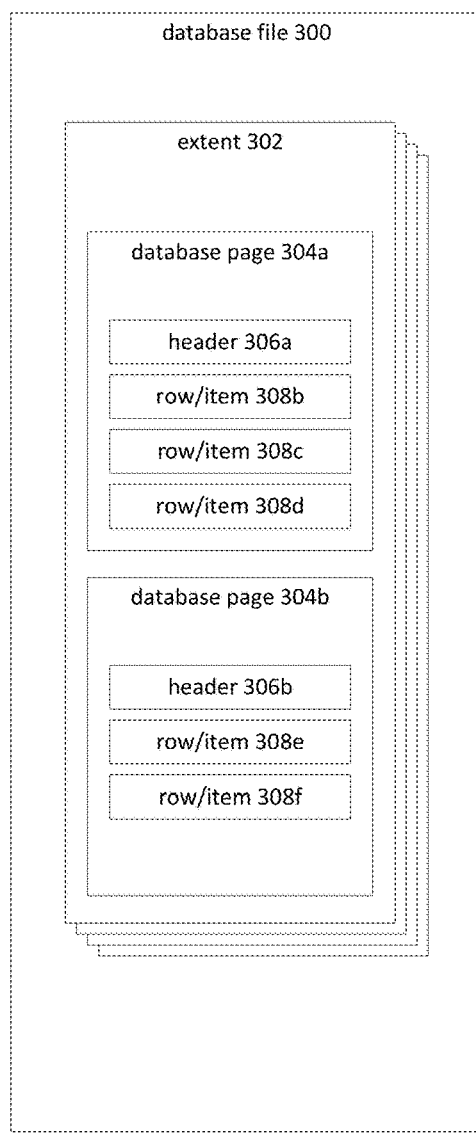
FIG. 3 is a block diagram depicting an arrangement of database management system data stored within a database file.

Within each file, data may be further subdivided in a manner similar to that depicted in FIG. 3. Those of ordinary skill in the art will appreciate that the depicted arrangement is illustrative of general concepts involving data storage and should not be construed as limiting the scope of the present disclosure.

FIG. 3 depicts database file 300, which may contain one or more extents such as extent 302. Although not explicitly depicted in FIG. 3, file 300 and extent 302 may also contain information such as headers, indexes and metadata. In some embodiments extent 302 may be defined as having a fixed size, such as 32 kilobytes. Each extent 302 may, for example, be defined as containing a fixed number of database pages, such as depicted database pages 304a and 304b.

Database page 304a is depicted as containing rows or items 308a, 308b, 308c and 308d. Each database page may contain a number of rows according to the size of the database page and the amount of memory occupied by each row or item. In some embodiments, a single row may span multiple pages. Each database page may also contain header, index and metadata information, such as depicted headers 306a and 306b, which may for example provide information allowing the number of rows contained within the page to be determined or allowing the rows or items to be accessed. In FIG. 3, database page 304b is depicted as having a similar arrangement as database page 304a. However, database page 304b is depicted as containing only two rows or items, 308e and 308f, instead of the three contained by database page 304a. In some embodiments, the size of each row or item may be different, so that a different number of rows may fit in each fixed-sized database page. Another possibility, not mutually exclusive, is that the database page is only partially filled and may later be modified to contain additional rows or items.

The arrangement depicted by FIG. 3 involves database pages with fixed sizes of 8 kilobytes each, while a solid-state drive may have page sizes of 4 kilobytes and an erase block size of 8 kilobytes. Those of ordinary skill in the art will appreciate that these figures are illustrative and should not be viewed as limiting the scope of the disclosure. Because a database page may be different in size compared to a drive memory page, the write amplification problems found in some solid-state drive devices may be further compounded.

Figure 4:
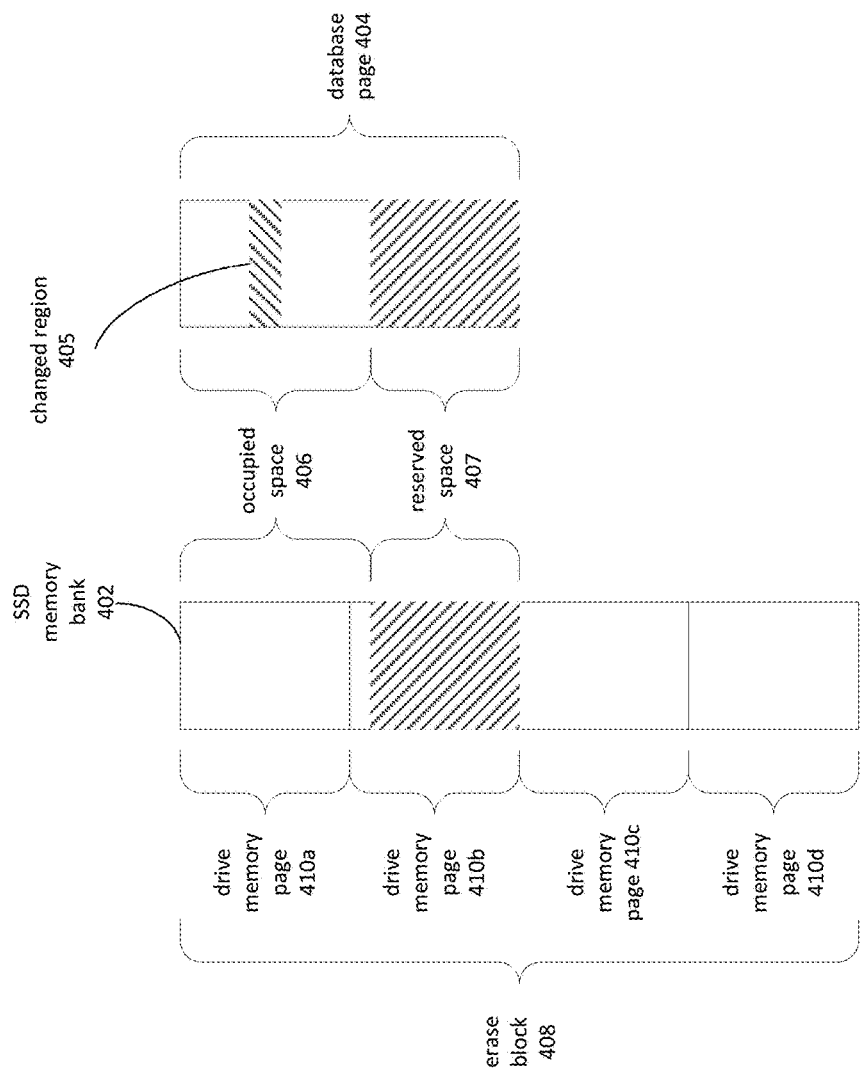
FIG. 4 is a diagram depicting a database page and corresponding solid-state drive memory pages with the database page contents stored thereon.

FIG. 4 is a diagram illustrating the problem of write amplification as it might be seen when using a solid-state drive in conjunction with a database management system. Database page 404 may be 8 kilobytes in length and comprise occupied space 406 and reserved space 407. Within the occupied space, a comparatively small changed region 405 may have been altered.

A solid-state drive may contain memory bank 402, which might comprise a plurality of drive memory pages, such as drive memory page 410a. Erase block 408 might comprise drive memory pages 410a, 410b, 410c and 410d. The size of an erase block such as erase block 408 might be several times larger than the size of an individual drive memory page, such as drive memory page 410a.

For at least some classes of solid-state drives, writing database page 404 to storage may require an erase-write cycle as described herein. Regarding FIG. 4, the erase portion of the cycle might require an erasure of drive memory pages 410a, 410b, 410c and 410d. Because database page 404 is larger than any of the individual drive memory pages, drive memory pages 410a and 410b must both be rewritten to contain database page 404. However, because the erase portion of the erase-write cycle affected all four pages in erase block 408, all four drive memory pages must be written.

The problem of write amplification may also be a significant factor even when erase-write cycles are not a consideration. Although database pages might be made to fit within a smaller amount of memory, for example in less than 4 kilobytes, a size that is considered optimal for drive performance is not necessarily optimal for database performance. Optimal database page size may depend on various factors such as locking, the number of rows contained within each block, indexing method, indexing depth and so forth. Although input/output efficiency is one of the factors to be considered in setting an optimal database page size, one or more of the other factors may predominate in some cases. Accordingly, it may be advantageous to use a technique or mechanism that helps to optimize database interaction with a solid-state drive without being reliant on reducing the database page size.

In an embodiment, a lossless compression algorithm may be employed to reduce the number of drive memory pages needed to store a database page. Lossless compression algorithms identify statistical redundancies in a set of data in order to encode the data using fewer bits. A variety of compression algorithms may be employed. Non-limiting examples include variants of Lempel-Ziv ("LZ") such as LZ1 and LZ2, Huffman encoding, grammar-based code, arithmetic coding and so forth.

In general terms, the Lempel-Ziv algorithms operate by replacing repeating occurrences of data with encoded values. The encoding may be maintained in a dictionary. In LZ1 compression, the dictionary encompasses a sliding window over the data being compressed, while LZ2 involves a comprehensive dictionary over the entirety of the data. Variants of Lempel-Ziv that might be employed by various embodiments include LZ77, LZ78, LZMW, LZ01B-6, Lempel-Ziv-Markov and LZJB.

Figure 5:
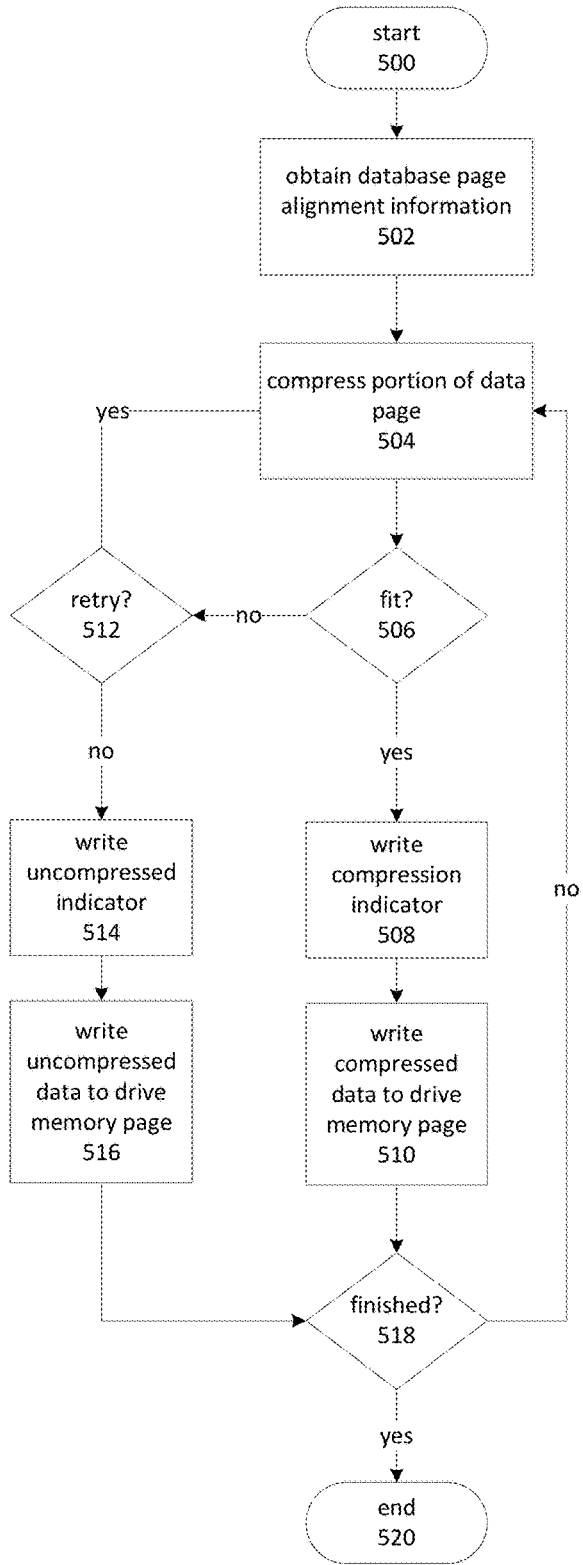
FIG. 5 is a flowchart depicting an embodiment for writing aligned and compressed database page segments to a solid-state drive.

FIG. 5 depicts an embodiment for employing a compression algorithm to write database pages. Although depicted as a series of operations beginning at operation 500 and ending at operation 520, those of ordinary skill in the art will appreciate that the depicted operations are illustrative of general concepts, and that some of the depicted operations may be altered, omitted, reordered or performed in parallel.

At operation 502, information describing the alignment or structure of a database page is received. The information may be received from various application components, such as a database storage engine. In general terms, the information refers to regions within the data that should not be split between drive memory pages, between compressed segments of the data or other unit that will be read or written as a unit.

Referring to FIG. 3 as an example, the alignment or structure information may be descriptive of extent 302 and database pages 304a and 304b. In particular, the information may describe the boundaries between pages and between individual rows within pages. This information may be used to determine how database pages 304a and 304b could be divided. It may be advantageous to ensure that a given drive memory page does not include partial rows or data from multiple database pages. One reason this may be advantageous is that values contained within a row would not be split between drive memory pages, which may result in improved read and write efficiency.

At operation 504, a portion of the database page may be compressed. A compression algorithm may be selected based on a variety of factors including compression rate, speed, CPU utilization and memory consumption. A compression rate may be described as an indication of the algorithm's effectiveness at reducing the size of input data. It may sometimes be expressed in terms of a ratio or a percentage. Selection of an appropriate compression algorithm may involve balancing the compression rate against other costs, such as the time needed to run the algorithm.

Traditional applications of compression algorithms may involve compression of an entire file or other collection of data. This approach may be advantageous in some cases, because compression algorithms may depend on dictionaries of commonly occurring character patterns. When these patterns are found throughout the entirety of the data, a single entry in the dictionary can represent the repeated character pattern and an improved compression rate can be achieved. However, this approach may not be ideal for optimizing the interaction between a database management system and a solid-state drive.

In an embodiment, a segment of the database page may be selected for compression based on the size of a drive memory page and a predicted compression rate for a compression algorithm. For example, if a drive memory page is 4 kilobytes in length and a compression algorithm is predicted to reduce input data to 50% of its original size, then a 6 kilobyte segment of a database page may be selected for compression.

When the compression algorithm completes, the size of the compressed database page segment may be compared to the size of the drive memory page at operation 506. If the compressed segment does not fit, a determination to retry compression may be made at operation 512. In an embodiment, a fixed number of retry attempts are made. Other possible factors include the amount of time elapsed during compression attempts, the amount of data available to be compressed, the calculated effectiveness of the compression algorithm and so forth.

Embodiments may also attempt a retry when the compression algorithm is more effective than predicted. If the compressed segment is of a size that is less than the size of the drive memory page, an embodiment may retry the compression using a larger segment size. The larger size may be determined using the rate of compression just achieved, after being adjustment for alignment on internal boundaries within the database page and allowing for a margin of error in the predicted compression rate.

If a retry is determined to be inappropriate, operations 514 and 516 may be performed. At operation 514, header information may be written to the drive memory page indicating that data stored in the drive memory page is uncompressed. At operation 516, an uncompressed segment of the database memory page may be written. The segment may be sized to fit into the memory page size of the solid-state drive. Continuing the previous example, the drive memory page size may be 4 kilobytes, so a segment of 4 kilobytes, less any header or other required information or adjustments, could be stored.

If a retry is determined to be appropriate, operations 504 and 506 may be repeated. Continuing the previous example, if the compressed database page was 5 kilobytes in length, a new predicted compression rate could be calculated at 83.3% and a 4.8 kilobyte segment of the database page could be selected. To prevent a row or other logical entity contained within the database page from being split across row boundaries, embodiments may select a size somewhat smaller than the target size in order to align with internal boundaries within the database page.

If the new compressed segment of the database page is small enough to fit into a drive memory page, the process may continue to operations 508 and 510. At operation 508, information describing the compression state may be written as header information to a drive memory page. In various embodiments, the header information may correspond to a database page header. The database page header may be updated to include compression indicators and subsequently written to a drive memory page. The database page header may contain compression indicators corresponding to each drive memory page used to store the database page. Compression indicators may be indicative of whether or not data stored in a drive memory page is compressed, what compression algorithm was used and any compression parameters that were supplied.

At operation 510, the compressed segment of the database page may be written to the drive memory page. Embodiments may buffer writes to the solid-state drive until all of the data corresponding to a database page is ready to be written. This approach may allow information such as the database page header to be updated throughout the process and then written once to a drive memory page.

At operation 518, it may be determined that portions of the database page remain to be written to the solid-state drive. Operations beginning at 504, or in some embodiments 502, may be repeated until the entire database page has been written.

The operations between start 500 and end 520 may be repeated to store additional database pages. In an embodiment, a drive memory page partially occupied by the last segment of a database page may be filled with additional data from the first segment of a second database page. However, it may be advantageous to include only entirely compressed data in a drive memory page, or entirely uncompressed data. In an embodiment, the last segment of a database page is not compressed if its size is below a threshold value.

Those of ordinary skill in the art will appreciate that the write operations described by FIG. 5 are intended to be illustrative of the contents of data written to a solid-state drive and not to limit the scope of the disclosure regarding the actual order in which data is written. For example, in an embodiment multiple database pages may be prepared for writing, stored in a cache or buffer and then transmitted to the solid-state drive for storage in a single subsequent operation.

When reading data from a database page stored on a solid-state drive, it may be advantageous to minimize the number of drive memory pages that need to be read from the device. For example, an index-based scan of a table may require access to 100 rows scattered throughout various database pages. If the data for an individual row spans from the end of one drive memory page to the beginning of another, two drive memory pages must be read to access the row. Two separate decompression operations may also be required. Accordingly, an embodiment ensures that the database page segments stored in a memory page do not span drive memory page boundaries.

Figure 6:
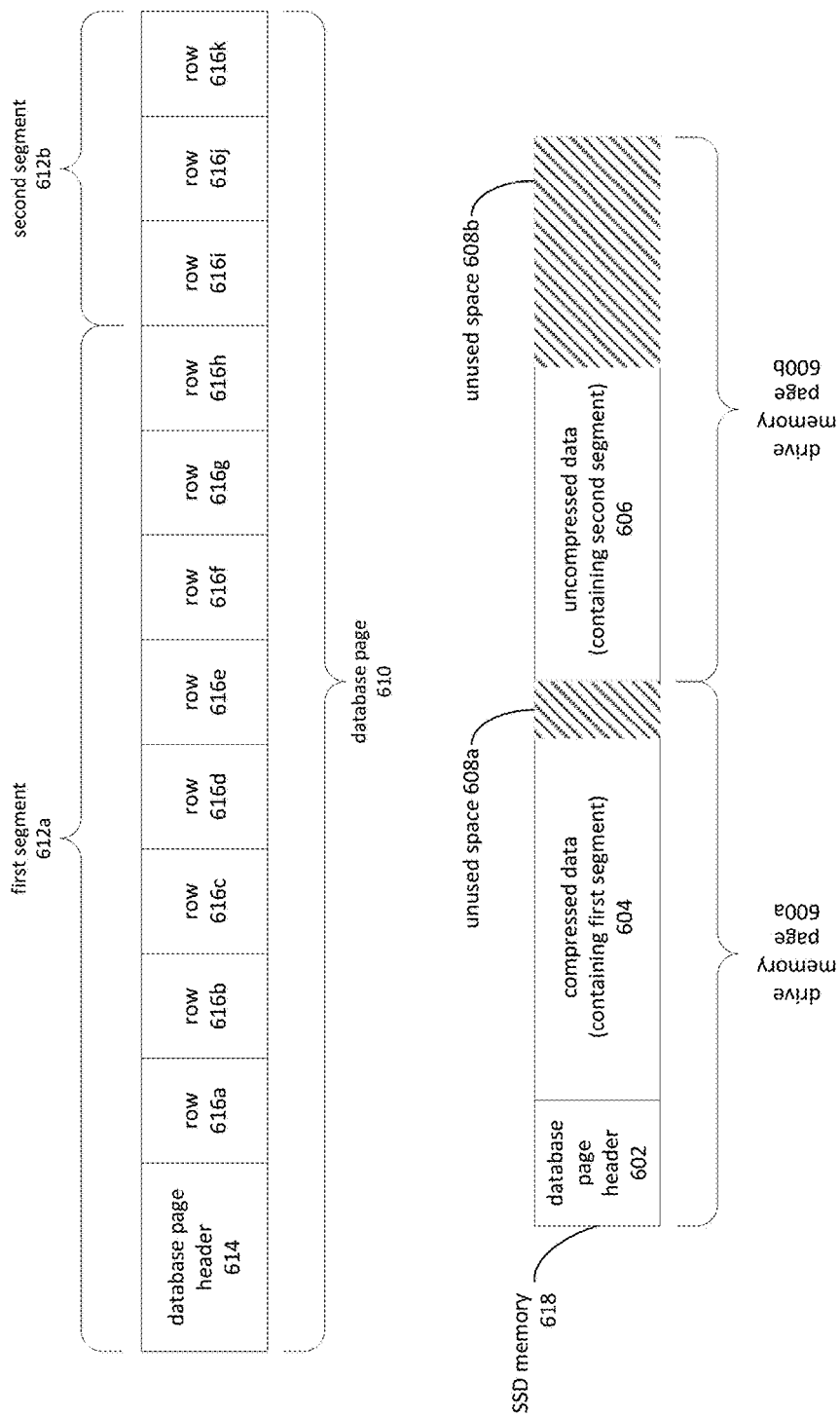
FIG. 6 is a diagram depicting a database page and corresponding solid-state drive memory pages having the database page stored thereon using techniques consistent with aspects of the present disclosure.

FIG. 6 is an illustrative example of segmenting along row boundaries. FIG. 6 depicts drive memory pages 600a and 600b, in which database page 610 has been stored. Database page 610 comprises database page header 614 and rows 616a-616k. In this example, database page 610 has been divided into two segments. First segment 612a comprises database page header 614 and rows 616a-616h. Second segment 612b comprises rows 616i-616k.

FIG. 6 depicts database page 610 as having been stored in two drive memory pages, 600a and 600b. On drive memory page 600a, database page header 602 has been stored in uncompressed form, along with indications of which drive memory pages contain compressed data. In the example of FIG. 6, database page header 602 may indicate that drive memory page 600a contains compressed data 604, and that drive memory page 600b contains uncompressed data 606. Compressed data 604 contains, in compressed form, the data corresponding to first segment 612a. Data corresponding to second segment 612b is contained in uncompressed data 606. Embodiments may employ a combination of compression algorithms. If so, database page header 602 may contain information indicating which compression algorithm was used to compress the data stored on drive memory page 600a.

Drive memory page 600*a* and drive memory page 600*b* contain unused space 608*a* and 608*b*, respectively. It may be advantageous to allow for unused space in each drive memory page so that rows do not span drive memory page boundaries. However, some embodiments may allow rows to span page boundaries. For example, various database management systems may allow for variable length data types or large binary objects, which may be physically arranged at the end of the row. In some cases, storage of these objects may require spanning drive memory page boundaries. In other cases the advantages of not spanning row boundaries might not be significant compared to the space savings obtained by filling each drive memory page to its maximum capacity.

In an embodiment, the first segment or segments containing metadata information such as a database page header is not compressed. This may be advantageous when the database page header needs to be frequently accessed. In addition, compression algorithms may work most efficiently when all of the data being compressed is similar, which may be the case when row, item or column data is compressed. Accordingly, compression rates may improve by excluding the database page header.

Compression algorithms may work most efficiently when various patterns frequently recur within the data being compressed. Repetitive patterns may be found in database tables, which may for example have values such as zip codes, area codes and so forth that are likely to be repeated. In some cases, a given pattern may recur throughout the data, while in other cases a pattern might be clustered in a single region within the table. When this occurs, the compression rate may also vary depending on how many times a pattern repeats within the data being compressed.

Figure 7:
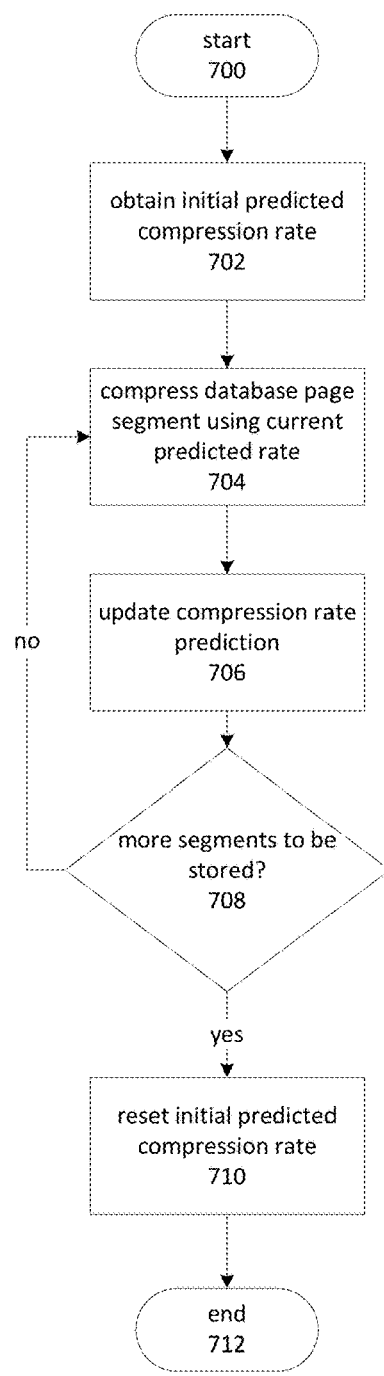
FIG. 7 is a flowchart depicting an embodiment for dynamically adjusting a forecasted compression rate.

FIG. 7 depicts an embodiment for dynamically adjusting a predicted compression rate. As described herein, a prediction of the compression rate may be employed to determine how much data to attempt to fit within a drive memory page. An initial prediction may be based on experimental data, trial and error and so forth. During use, the prediction may be improved by measuring the actual compression rates being achieved.

At start operation 700, one or more predicted compression rate values may be made available. There may be a single value if only one compression algorithm is employed, or multiple values if the embodiment utilizes more than one algorithm. In addition, it may be advantageous to retain one or more compression rate values per table or per column. Initially, these may be presented as values based on experimental data, best judgment or trial and error. During use these values may be refined based on measured values.

In various embodiments, a value other than a compression rate may be used for the same purpose, and may be seen as an equivalent of the compression rate. In may be preferable to express the compression rate as a prediction of the amount of data that could be made to fit within a drive memory page. For example, if a compression algorithm is predicted to shrink data by 50% and the drive memory page size is 4 kilobytes, an equivalent to the compression rate may be a value of 6 kilobytes. Those of ordinary skill in the art will recognize that numerous alternative variations are possible.

At operation 702, the compression rate corresponding to the current operation is retrieved. As noted, the compression rate may correspond to a particular algorithm, table, column and so forth. The compression rate can then be used to determine how large of a database page segment to compress, and the compression may be performed as depicted by operation 704.

After a compression attempt, the current compression rate prediction may be updated at operation 706. The updated prediction may be determined in a variety of ways, including using the most recent value, using a moving average, using a median value and so forth. The updated value may pertain only to a single table or column, or may be a global value. In some embodiments, the predicted rate of compression may be updated after a threshold number of rows, database pages or other entities have been stored.

At operation 708, a determination is made concerning whether additional segments of the database page need to be stored. If so, processing may continue at operation 704, where the prediction updated at operation 706 may be used to determine the size of the next database page segment.

At operation 710, the predicted value may be reset to the initial value or some other previous value. In a row-oriented database, this might be done at the end of storing a first table before moving on to store a second table. Similarly, for a columnar database the current predicted compression rate value might be reset after storing each column. The process of storing the table or column then completes at operation 712. Additional data may be processed subsequently using the reset values.

Various compression algorithms may be more efficient at processing larger data segments then they are at processing smaller segments. In some cases, this may be because a single dictionary of pattern encodings may be used throughout the data segment, resulting in better compression rates, reduced latency and improved CPU utilization. For this reason, it may be more efficient to align the compression on a larger region than a single drive memory page. Spanning multiple drive memory pages may proceed in a manner similar to the sequence of operations depicted in FIG. 5.

Figure 8:
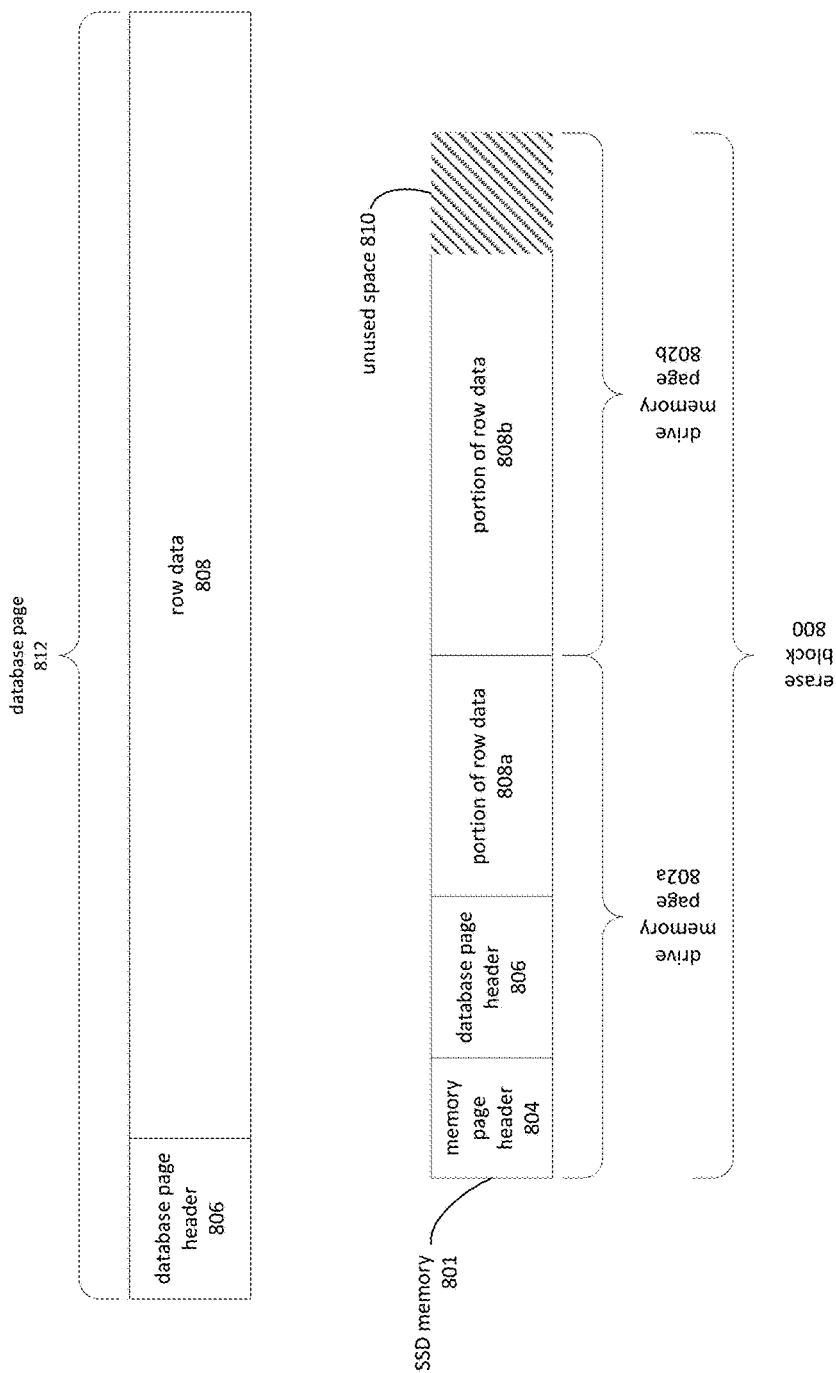
FIG. 8 is a diagram depicting a database page and corresponding solid-state drive memory pages having the database page stored thereon using compressed data spanning multiple drive memory pages.

FIG. 8 depicts a database page 812 which has been stored in a manner that spans multiple drive memory pages 802*a* and 802*b*. Database page 812 may comprise database page header 806 and row data 808. When stored, drive memory page 802*a* may contain database page header 806 and a portion of row data 808, indicated by element 808*a*. Drive memory page 802*b* may contain a second portion of row data 808, indicated by element 808*b*.

In various embodiments, the number of pages spanned may depend on a comparison of compression algorithm performance on larger data sizes versus performance on smaller data sizes. Another factor that may be considered is the uniformity of data within the data being compressed. Larger data sizes may be preferable when similar data is repeated throughout the data, while smaller data sizes may be preferable when the nature of the data changes rapidly. For example, homogeneous columnar data may suggest that larger compression sizes are advantageous, while tabular data with little data repetition may favor smaller compression sizes. An example might involve a database hosting data from multiple third-party customers. This data may have little uniformity and thus might not benefit from large compression sizes.

When a single compressed segment spans multiple drive memory pages, it may be advantageous to also align on erase blocks. This may allow more efficient compression because of the larger data sets, and also reduces the need to erase and rewrite drive memory pages that are logically unchanged. In various embodiments, a compressed segment may span a plurality of erase blocks.

The group of two drive memory pages 802*a* and 802*b* is led by memory page header 804, which may indicate whether or not the group of pages is compressed and may also indicate the number of drive memory pages that are included in each group of drive memory pages. In other embodiments, each drive memory page may have a header, which may include a reference to the first drive memory page in the span.

Database page header 806 may be stored at the beginning of the multiple page span. For example, FIG. 8 depicts database page header 806 as being stored in drive memory page 802*a*. In some embodiments database page header 806 may be stored in uncompressed form. In other embodiments database page header 806 may be compressed with the row data, or compressed separately so that it may be independently extracted. It may be advantageous to provide for access to the database page header without needing to decompress all of the compressed data, which may require separate compression of the page header depending on the compression algorithm that is used.

There may be various advantages to compressing larger amounts of data in each span, due at least in part to greater reuse of dictionaries or other encodings used by compression algorithms. However, when compression algorithms are applied to data maintained by a database management system, the benefits of compressing larger amounts of data may in some cases diminish if the amount of data compressed is too large. Database data may vary in nature over the course of the data, or there may be clusters of related data separated by expanses of unrelated data. This may be due in part to sorting imposed on the table. Some embodiments may reduce the size of the span based on monitoring the rates of compression achieved. Other embodiments may base the compression size on various statistical properties of the data, such as a data distribution histogram.

In an embodiment, a memory page header and database page header may be stored on a drive memory page as a combined structure. The database page header may, for example, be stored uncompressed in a leading portion of a drive memory page. A field within the memory database page header may indicate whether the remainder of the database page, for example row data 808 in FIG. 8, is stored in compressed or uncompressed form.

Figure 9:
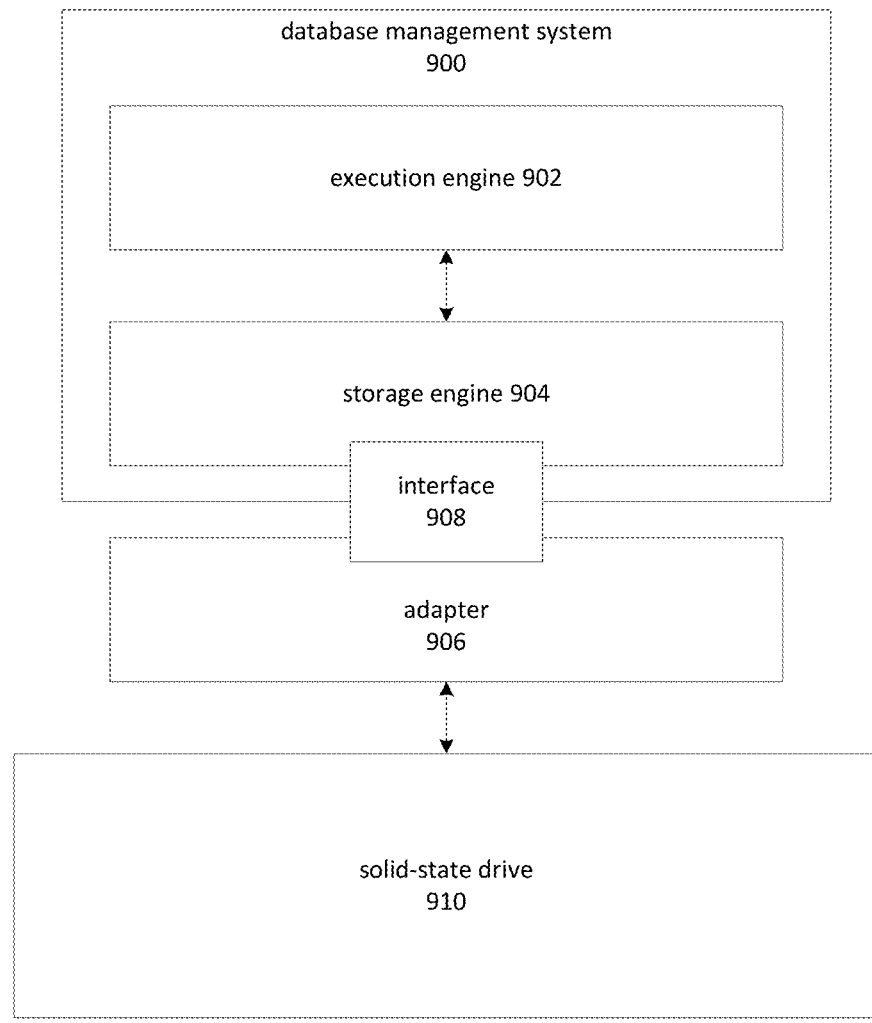
FIG. 9 is a block diagram depicting an embodiment of database management system components coupled to a solid-state drive using an adapter layer that performs compression.

Various aspects of the present disclosure may be practiced by the system depicted in FIG. 9, which involves database management system 900 storing data on solid-state drive 910. Database management system 900 may comprise execution engine 902 and storage engine 904. In general, execution engine 902 may be described as a component of a database management system that translates queries into lower-level requests to store or retrieve data. Storage engine 904 may be described as a database management system component that processes these requests.

Adapter 906 provides functionality involving alignment and compression of database page data to optimize interactions with solid-state drive 910. In an embodiment, storage engine 904 may comprise an implementation of interface 908, which can be called upon by adapter 906 to obtain database page data and alignment information to allow for improved interaction with the solid-state drive 910. In other embodiments, storage engine 904 and adapter 906 may be merged to form a single component. Those of ordinary skill in the art will recognize, however, that layering depicted in FIG. 9 is illustrative and that the various elements of FIG. 9 may be rearranged in many alternated configurations while remaining consistent with the present disclosure.

Figure 10:
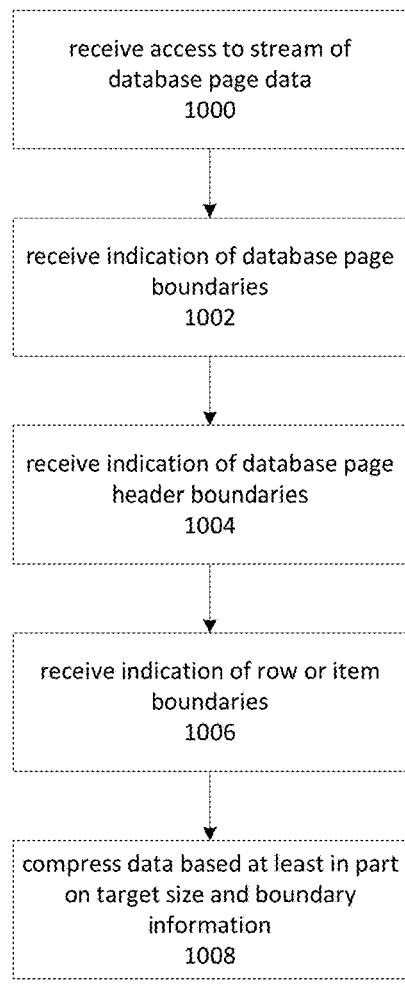
FIG. 10 is a flowchart depicting an embodiment for determining boundaries of database pages for use by the adapter layer.

FIG. 10 depicts an embodiment for interfacing between a storage engine and an adapter. Although depicted as a series of operations, those of ordinary skill in the art will recognize that some of the depicted operations can be omitted, altered or performed in parallel. For example, FIG. 10 depicts receiving various indications, which may be provided in a single structure rather than received in sequence.

Operation 1000 depicts receiving access to a stream of database page data. For example, the storage engine might determine that a set of database pages must be stored. A memory array containing these pages might be provided to adapter 906, as depicted in FIG. 9. In an embodiment, an adapter might be provided with access to the data via an application programming interface, which it might invoke upon being notified that database pages need to be stored. Many alternative embodiments are possible.

Operation 1002 involves receiving an indication of database page boundaries. The adapter layer may use the indication to determine where, in an array of memory or similar structure, one database page ends or another begins. Other embodiments may, for example, provide access to structures that are representative of a single database page, to an array of database page structures, to an array of pointers to database page structures and so forth.

Operation 1004 involves receiving an indication of database page header boundaries. In various embodiments, database pages may comprise header information describing aspects of the data stored in the page. As described herein, it may be advantageous to store database page header information separately from row or item data. Accordingly, a component such as adapter 906 from FIG. 9, may use the indication provided in operation 1004 to determine how to extract this information.

Operation 1006 involves receiving indications of row or item boundaries within the stream of database page data. As noted herein, it may be advantageous to store only whole rows within a given drive memory page. The indication received in operation 1006 may be used for this purpose.

Operation 1008 may involve extracting a segment of data from the stream of database page data. The amount of data extracted may depend on a target compressed size, a prediction compression rate and the indicated boundaries.

The target compressed size may be determined based on a solid-state disk's drive memory page size. In some embodiments, the size of a span of drive memory pages or erase blocks may be utilized as the target size. The predicted compression rate may depend on a variety of factors, including those described herein. An initial compression rate may be based on various factors such as experimental data applied to the selected compression algorithm. The predicted value may also be dynamically adjusted based on actual compression rates.

Based on the target compressed size and the predicted compression rate, a target uncompressed data size may be determined. However, the amount of data to be compressed may be adjusted based on the indicated boundary information. For example, if the target uncompressed size is 6 kilobytes, but the nearest row boundary is located at the 5.8 kilobyte mark in the stream of database page data, it may be preferable to compress only 5.8 kilobytes of data so that a partial row is not included. Various embodiments may round the target uncompressed size up or down.

Figure 11:
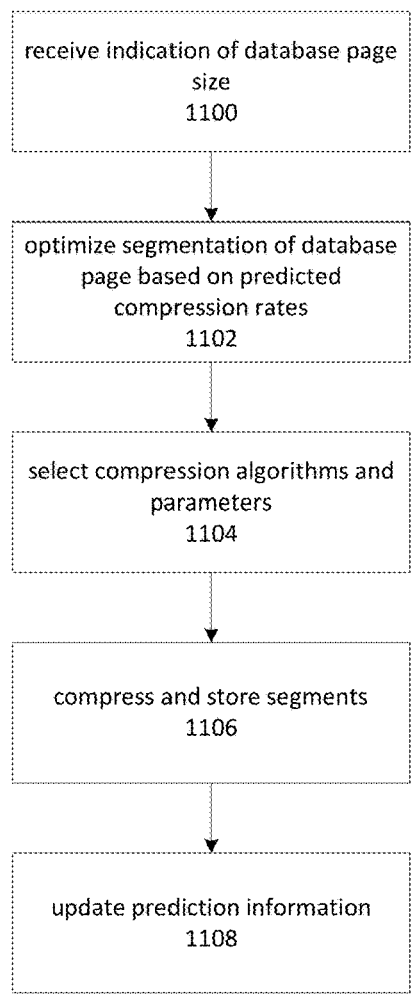
FIG. 11 is a flowchart depicting an embodiment for segmenting a database page using a minimization and maximization approach.

It may be advantageous to reduce or eliminate retried compression attempts. FIG. 11 depicts an embodiment for segmenting a database page based on the total size of the database page, compression statistics for available compression algorithms, and a statistical optimization approach to dividing the database page into segments that, when compressed, are likely to be under the drive's memory page size.

At operation 1100, an indication of the database page size is received. The size is an indication of how much memory should be included in the compression attempt. It may be adjusted based on various factors, such as whether or not a database page header is to be included in the compressed data.

At operation 1102, the database page to be compressed is segmented using a statistical optimization approach based in part on a probabilistic model of the compression rate. The segmentation may be determined, for example, by maximizing the uncompressed size of the segments while minimizing the probability that compression will fail to reduce the segments to a size small enough to fit within a drive memory page.

At operation 1104, the probability of insufficient compression may be further used by various means, such as refining parameters of the compression algorithm or selecting an alternative compression algorithm. Parameters may involve values supplied to the compression algorithm to control its behavior. In various embodiments, parameters may be supplied as values to a function or procedure that performs the compression, or compiled as constant or enumerated values within the code that performs the compression. Some compression algorithms may allow for varying compression levels, multiple passes, and so forth, which may be controlled through the use of parameters. In an embodiment, the segmentation determined by operation 1102 may be refined by applying an increased level of compression to those segments whose probability of insufficient compression is highest. In another embodiment, selection of an appropriate alternate compression algorithm, or alternate parameters such as those indicating increased compression levels, may be part of the probabilistic model used in the minimization and maximization analysis depicted by operation 1102.

At operation 1106, the segments may be compressed and stored in drive memory pages. Various approaches may be employed to handle cases where a segment is not compressed sufficiently to fit within a single drive memory page. In an embodiment, the segment may be split and stored uncompressed in two successive drive memory pages. In another embodiment, the failed segment and all remaining segments are resegmented using less optimistic compression rates.

Operation 1108 depicts updating the statistical models based on compression rates achieved during compression. The statistical models may be updated at various times, including after each compression attempt or after an entire page has been compressed. The model could also be updated following each insufficient compression.

Figure 12:
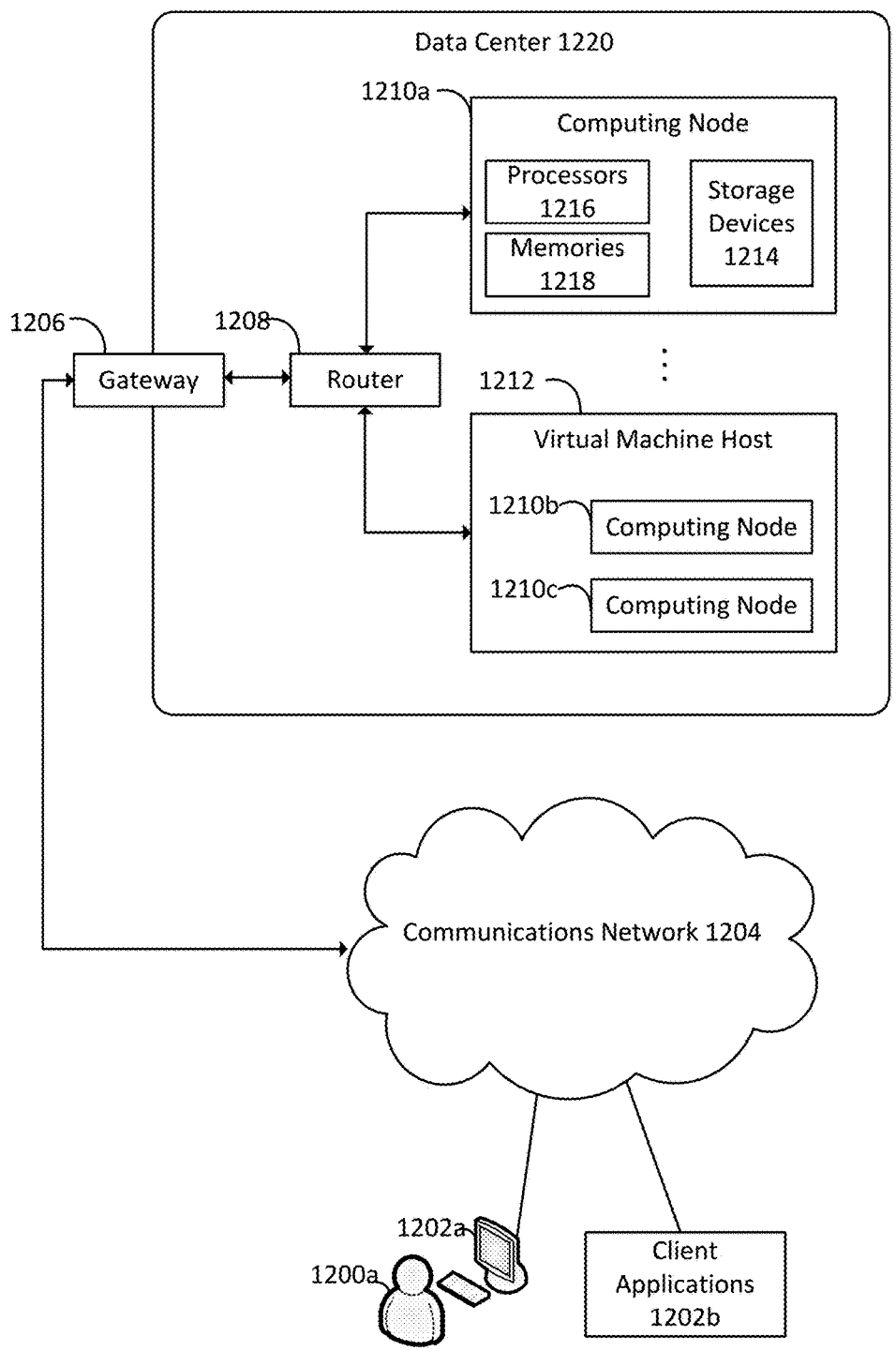
FIG. 12 is a block diagram depicting an embodiment of a computing environment in which aspects of the present disclosure may be practiced.

FIG. 12 is a diagram depicting an example of a distributed computing environment on which aspects of the present invention may be practiced. Various users 1200*a* may interact with various client applications, operating on any type of computing device 1202*a*, to communicate over communications network 1204 with processes executing on various computing nodes 1210*a*, 1210*b* and 1210*c* within a data center 1220. Alternatively, client applications 1202*b* may communicate without user intervention. Communications network 1204 may comprise any combination of communications technology, including the Internet, wired and wireless local area networks, fiber optic networks, satellite communications and so forth. Any number of networking protocols may be employed.

Communication with processes executing on the computing nodes 1210*a*, 1210*b* and 1210*c*, operating within data center 1220, may be provided via gateway 1206 and router 1208. Numerous other network configurations may also be employed. Although not depicted in FIG. 12, various authentication mechanisms, web service layers, business objects or other intermediate layers may be provided to mediate communication with the processes executing on computing nodes 1210*a*, 1210*b* and 1210*c*. Some of these intermediate layers may themselves comprise processes executing on one or more of the computing nodes. Computing nodes 1210*a*, 1210*b* and 1210*c*, and processes executing thereon, may also communicate with each other via router 1208. Alternatively, separate communication paths may be employed. In some embodiments, data center 1220 may be configured to communicate with additional data centers, such that the computing nodes and processes executing thereon may communicate with computing nodes and processes operating within other data centers.

Computing node 1210*a* is depicted as residing on physical hardware comprising one or more processors 1216, one or more memories 1218 and one or more storage devices 1214. Processes on computing node 1210*a* may execute in conjunction with an operating system or alternatively may execute as a bare-metal process that directly interacts with physical resources such as processors 1216, memories 1218 or storage devices 1214.

Computing nodes 1210*b* and 1210*c* are depicted as operating on virtual machine host 1212, which may provide shared access to various physical resources such as physical processors, memory and storage devices. Any number of virtualization mechanisms might be employed to host the computing nodes.

The various computing nodes depicted in FIG. 12 may be configured to host web services, database management systems, business objects, monitoring and diagnostic facilities and so forth. A computing node may refer to various types of computing resources, such as personal computers, servers, clustered computing devices and so forth. When implemented in hardware form, computing nodes are generally associated with one or more memories configured to store computer-readable instructions, and one or more processors configured to read and execute the instructions. A hardware-based computing node may also comprise one or more storage devices, network interfaces, communications buses, user interface devices and so forth. Computing nodes also encompass virtualized computing resources, such as virtual machines implemented with or without a hypervisor, virtualized bare-metal environments, and so forth. A virtualization-based computing node may have virtualized access to hardware resources, as well as non-virtualized access. The computing node may be configured to execute an operating system, as well as one or more application programs. In some embodiments, a computing node might also comprise bare-metal application programs.

A DBMS is a software and hardware system for maintaining an organized collection of data. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages such as structured query language ("SQL"), while others use APIs containing operations such as put( ) and get( ) and so forth. Interaction with the database may also be based on various protocols or standards, such as hypertext markup language ("HTML") and extended markup language ("XML"). A DBMS may comprise various architectural components, such as a storage engine that acts to store data one on or more storage devices such as solid-state drives.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system comprising:
   at least one processor; and
   one or more memories having stored thereon computer-readable instructions that, upon execution by the at least one processor, cause the system at least to:
   determine a first size of a first segment of data to compress based at least in part on a value indicative of a compression rate and a page size of each of one or more memory pages of a storage device;
   compress the first segment of the data, the first segment being of the first size, to form a compressed segment of a second size; and
   store the compressed segment in a memory page of the one or more memory pages when the second size is less than the page size.

2. The system of claim 1, further comprising one or more memories having stored thereon computer-readable instructions that, upon execution, cause the system at least to:
   update the value indicative of the compression rate based at least in part on the second size.

3. The system of claim 1, further comprising one or more memories having stored thereon computer-readable instructions that, upon execution, cause the system at least to:
   store an uncompressed subset of the first segment of the data in a memory page of the one or more memory pages when the second size is greater than the page size.

4. The system of claim 1, further comprising one or more memories having stored thereon computer-readable instructions that, upon execution, cause the system at least to:
   determine to compress a second segment of the data in addition to the first segment of the data based at least in part on the second size of the compressed first segment being less than the page size page; and compress the second segment of the data in addition to the first segment of data.

5. The system of claim 1, further comprising one or more memories having stored thereon computer-readable instructions that, upon execution, cause the system at least to:

determine to form a second compressed segment based at least in part on one or more of an elapsed time to compress the first segment of the data, a number of attempts to compress the first segment of the data, and the first size of the first segment of the data; and form the second compressed segment.

6. The system of claim 1, wherein the one or more memory pages corresponds to an erase block.

7. The system of claim 1, further comprising one or more memories having stored thereon computer-readable instructions that, upon execution, cause the system at least to:

apply a Lempel-Ziv compression algorithm to the first segment of the data.

8. The system of claim 1, further comprising one or more memories having stored thereon computer-readable instructions that, upon execution, cause the system at least to:

select one or more of a compression algorithm and compression parameters based at least in part on the page size.

9. The system of claim 1, further comprising one or more memories having stored thereon computer-readable instructions that, upon execution, cause the system at least to:

write uncompressed header information indicative of a compression status to the one or more memory pages.

10. The system of claim 1, further comprising one or more memories having stored thereon computer-readable instructions that, upon execution, cause the system at least to:

determine the first size of the first segment of the data based at least in part on a probability of achieving the compression rate.

11. The system of claim 1, further comprising one or more memories having stored thereon computer-readable instructions that, upon execution, cause the system at least to:

receive, from a component of an application, information indicative of one or more internal boundaries in the data; and determine the first size of the first segment of the data based at least in part on the one or more internal boundaries.

12. A method, comprising:

determining a first size of a first segment of data to compress based at least in part on a value indicative of a compression rate and a page size of each of one or more memory pages of a storage device;

compressing the first segment of the data, the first segment of the first size, to form a compressed segment of a second size; and storing the compressed segment in a memory page of the one or more memory pages based on determining that the second size is less than the page size.

13. The method of claim 12, wherein the compressing is performed using a first compression algorithm, the method further comprising:

retrying compression of at least a subset of the first segment when the second size is greater than the page size.

14. The method of claim 12, further comprising:

retrying compression of at least a subset of the first segment.

15. The method of claim 12, wherein the first size of the first segment is based at least in part on a boundary within data of an application.

16. The method of claim 12, further comprising:

compressing the first segment of the data and an additional segment of the data based at least in part on the second size being less than the page size, to form an additional compressed segment; and storing the compressed additional segment in a memory page.

17. A non-transitory computer-readable storage medium having stored thereon instructions that, upon execution by a computing device, cause the computing device to at least:

determine a first size of a first segment of data to compress based at least in part on a value indicative of a compression rate and a page size of each of one or more memory pages of a storage device;

compress the first segment of the data, the first segment being of the first size, to form a compressed segment of a second size; and store the compressed segment in a memory page of the one or more memory pages when the second size is less than the page size.

18. The computer-readable medium of claim 17, having stored thereon further instructions that, upon execution by the computing device, cause the computing device to at least:

retry compression of at least a subset of the first segment when the second size is greater than the page size.

19. The computer-readable medium of claim 18, having stored thereon further instructions that, upon execution by the computing device, cause the computing device to at least:

stop compression of the at least a subset of the first segment based at least in part on an elapsed time.

20. The computer-readable medium of claim 17, wherein the first size of the first segment is based at least in part on a boundary within data of an application.

* * * * *